United States Patent

Brooks, Sr. et al.

Patent Number: 5,531,298
Date of Patent: Jul. 2, 1996

[54] BRAKE ACTUATOR

[75] Inventors: Frank W. Brooks, Sr., Dayton; Michael W. Fanelli; Ralph A. Gordon, both of Centerville; Douglas D. Willibey, West Carrollton; Jeremy H. Olson, Springfield; Donald E. Holmes, Greenville, all of Ohio

[73] Assignee: General Motors Corporation, Detroit, Mich.

[21] Appl. No.: 411,375

[22] Filed: Mar. 27, 1995

[51] Int. Cl.⁶ .................................................. F16D 51/00
[52] U.S. Cl. .......................... 188/78; 188/325; 188/336; 188/364; 188/250 F
[58] Field of Search .................................... 188/325, 364, 188/342, 250 F, 327, 328, 329, 2 D, 330, 331, 332, 333, 334, 341, 205 R, 336, 339, 340, 106 A, 106 F, 72.2, 78, 79.62, 79.64, 72.7, 72.9, 250 A; 74/110

[56] References Cited

U.S. PATENT DOCUMENTS

| | | | |
|---|---|---|---|
| 2,024,137 | 12/1935 | Adams | 188/78 |
| 2,069,344 | 2/1937 | White | 188/78 |
| 3,809,191 | 5/1974 | Woodward | 188/106 A |
| 4,184,571 | 1/1980 | Karasudani | 188/106 F |
| 4,619,347 | 10/1986 | Schreiner et al. | 188/106 F |
| 4,635,761 | 1/1987 | Smith et al. | 188/106 F |
| 4,702,352 | 10/1987 | Ingram et al. | 188/329 |
| 4,887,698 | 12/1989 | Hunt et al. | 188/325 |
| 5,195,617 | 3/1993 | Clemens | 188/29.62 |
| 5,246,093 | 9/1993 | Wang | 188/336 |

Primary Examiner—Douglas C. Butler
Attorney, Agent, or Firm—Jeffrey A. Sedlar

[57] ABSTRACT

A drum-type brake actuator provides increased force transmission efficiency and assembly simplicity. An anchor carries two pistons which are moved to apply a brake shoe by the cooperative operation of a lever and strut arrangement. The utilization of three pivot joints in a simplified mechanism results in high efficiency output.

4 Claims, 1 Drawing Sheet

1

BRAKE ACTUATOR

BACKGROUND OF THE INVENTION

The present invention relates to a mechanical drum brake actuator.

Brake actuators of numerous configurations are known. Mechanical drum brake actuators are primarily applicable to providing parking brake functions in a vehicle. Such a brake actuator generally operates to transmit force which is generally applied by a cable mechanism to two semi-circular brake shoes thereby applying force to a brake drum and achieving the braking function. A conventional brake actuator typically forces the shoes against the drum through a piston or strut that is connected to an operator. Such brake actuators generally include an undesirable number of component parts which complicates assembly and typically permit undesirable vertical or transverse movement of the mating shoe ends. Accordingly, a brake actuator of simplified configuration and improved force transmission efficiency is required.

SUMMARY OF THE INVENTION

The present invention concerns a brake actuator which includes an anchor serving the purposes of providing housing and mounting features, two pistons slidably carried by the anchor, a lever engaging one of the pistons and a strut pivotally interconnected with the lever and engaging the other piston. Application of input force to the lever is transmitted therethrough and through the strut to the two pistons which are forced to move linearly in opposing directions to provide movement to the brake shoe and effect braking forces. Preferably, the anchor, pistons, lever and strut are interchangeable between left and right handed brake actuators thereby reducing part proliferation. The preferred brake actuator provides improved force transmission efficiency and substantially eliminates vertical movement of the mating brake shoe ends.

DETAILED DESCRIPTION

Figure 1:
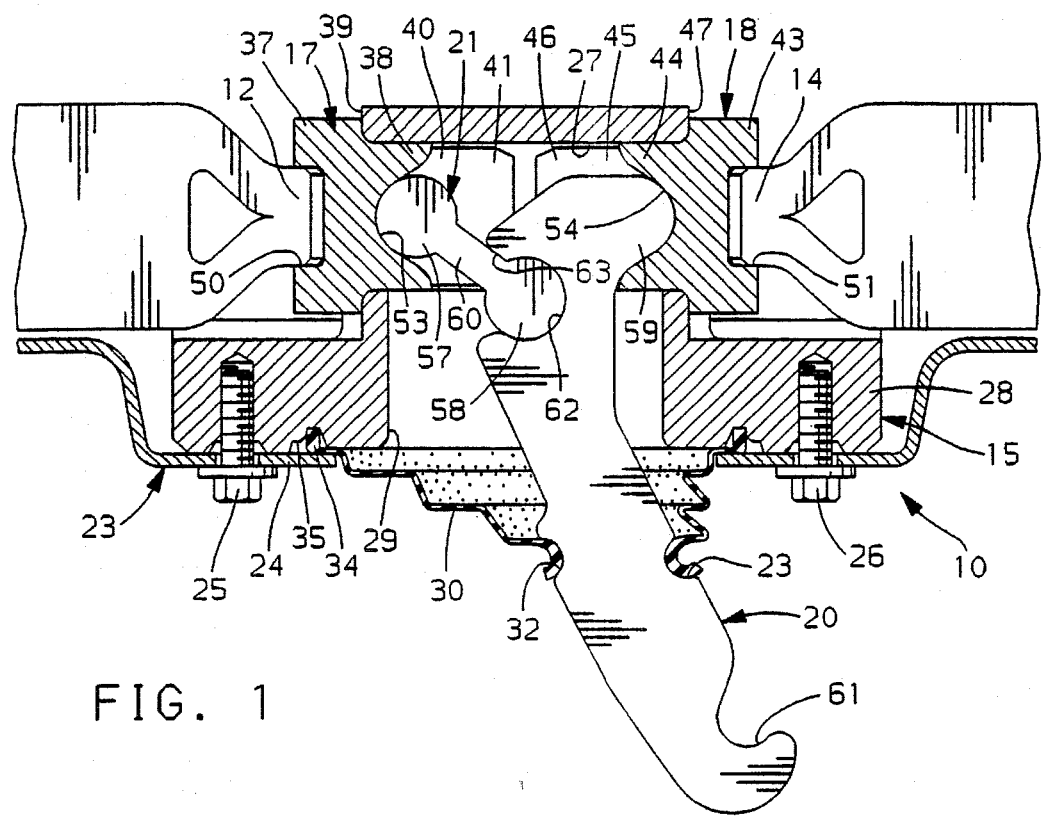
FIG. 1 is a sectional view of a brake actuator according to the present invention.

Referring to FIG. 1, illustrated is a brake actuator designated generally as 10 principally for use in a drum-type brake including drum-in-rotor type parking brakes. Brake actuator 10 is operable with one 330 degree circumferential brake shoe or two brake shoes connected together at opposite ends by an adjusting strut. In either case, two brake shoe ends 12 and 14 abut against an anchor 15. To energize braking, the shoe is forced against a drum (not illustrated) by pistons 17 and 18 through coaction with lever 20 and strut 21. Lever 20 is connected by a means such as a cable (not illustrated) to an operator (not illustrated).

Anchor 15 generally comprises a machined casting and is connected to a mounting plate 23, by bolts 25 and 26. Preferably, mounting plate 23 is an existing structure such as a bearing flange typically used in a vehicle suspension with bolts 25 and 26 being the same type of bolts that are used to attach the bearing (not illustrated). This eliminates a requirement to machine attachment points for the anchor 15 on the vehicle suspension member and the need for additional bolts in the assembly. The anchor 15 is preferably symmetrical so that it is applicable as either a left or right handed part. Anchor 15 includes mounting flange 28 which includes opening 29 through which lever 20 extends. Anchor 15 also includes bore 27 in which pistons 17 and 18 are slidably carried for providing guided linear movement.

A flexible boot 30 closes the opening 29 and engages lever 20 in notches 32 and 33 and includes a circumferential flange 34 which is engaged in groove 35 of anchor 15. Circumferential flange 34 is contained in groove 35 by flange 24 of mounting plate 23.

Piston 17 includes a cylindrical segment 37 which is slightly larger in diameter than the bore 27 providing a stop for inboard directed movement of the piston 17 through abutment with annular shoulder 39 of anchor 15. Piston 17 also includes cylindrical segment 38 in which slot 40 is formed. Cylindrical segment 38 is sized for slidable containment within bore 27. The existence of slot 40 creates two semi-cylindrical shaped legs such as leg 41 and between which strut 21 in the case of piston 17 or lever 20, in the case of piston 18 extend. Similarly to piston 17, piston 18 includes cylindrical segments 43 and 44, slot 45 and two semi-cylindrical legs such as leg 46. Cylindrical segment 43 abuts against annular shoulder 47 of anchor 15. Piston 17 includes opening 50 for receiving the brake shoe end 12. Similarly, piston 18 includes opening 51 for receiving the brake shoe end 14. Piston 17 includes socket 53 for receiving cylindrical segment 57 of strut 21. Similarly, piston 18 includes socket 54 for receiving end 59 of lever 20.

Both lever 20 and strut 21 are preferably stamped from flat metal stock. Lever 20 includes hook 61 for engaging an operator cable (not illustrated), socket 62 for receiving cylindrical segment 58 of strut 21 and stop 63. Strut 21 includes cylindrical segments 57 and 58 which are interconnected by rigid neck 60. Stop 63 of lever 20 interacts with neck 60 of strut 21.

In applying braking action, a force applied to lever 20 at hook 61 promotes toggle-like movement of lever 20 and strut 21 wherein neck 60 disengages from stop 63 as cylindrical segment 58 rotates in socket 62. The operation of lever 20 and strut 21 causes the sockets 53 and 54 and pistons 17 and 18 to be forced apart. This creates opposed outward sliding movement in pistons 17 and 18 such that brake shoe ends 12 and 14 are forced apart generally increasing the brake shoe circumference such as to apply the shoe to the interior surface of a drum (not illustrated) and effect braking force.

In assembling the component parts the strut 21 and lever 20 are connected together and subsequently installed through opening 29 engaging slots 40 and 45 and are interlocked together to prevent their disassembly. The parts are assembled in grease to provide a minimum of frictional losses in operation. The strut 21 may be oriented in either direction since both cylindrical segments 57 and 58 are the same, thereby resulting in assembly savings. The pistons 17 and 18 are interchangeable, with the sockets 53 and 54 accepting either the lever end 59 or cylindrical segment 57 of strut 21. The slots 40 and 45 operate to captivate the lever 20 and strut 21 and thereby orient the openings 50 and 51 in the pistons 17 and 18 such that they are aligned to accept the brake shoe ends 12 and 14. The sockets 53 and 54 are symmetrically balanced so that they may be produced by operations such as a powdered metal process or a steel heading process. The lever ratio of lever 20 is adaptable to change for matching the travel and output requirements of the individual application in which the brake actuator 10 is utilized.

Brake actuator 10 achieves increased piston travel because each socket 53 and 54 serves as a pivot point resulting in a doubling action from the movement of the hook 61 of the lever 20. By providing guided sliding movement of the pistons 17 and 18 in the bore 27 linear opposed movement of the brake shoe ends 12 and 14 is provided which substantially eliminates vertical movement thereof. By providing increased piston travel a brake shoe adjusting mechanism (not illustrated) which would otherwise be required may be eliminated with the design of brake actuator 10. Elimination of the adjusting mechanism provides additional space to thicken the cylindrical segments 37 and 43 of pistons 17 and 18 providing additional strength. This additional strength permits the pistons 17 and 18 to be manufactured using a less expensive process such as powder metal. The preferred powdered metal pistons 17 and 18 in turn have the added advantage of relatively high porosity which operates to hold lubrication and keep the piston lubricated over an extended life span.

Figure 2:
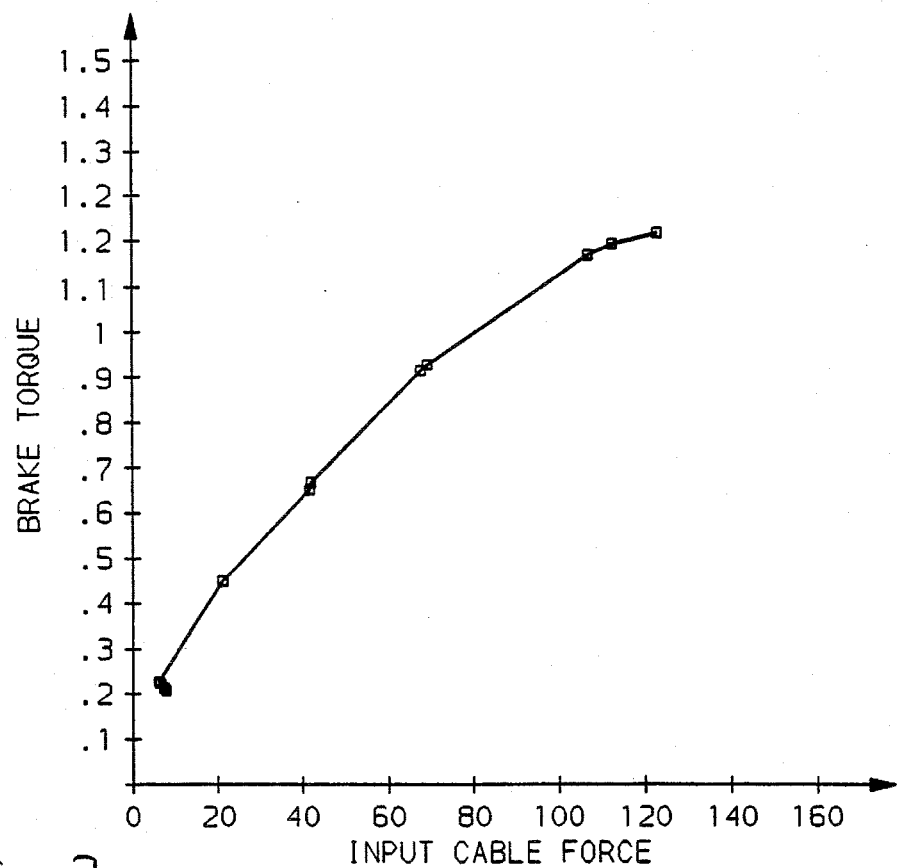
FIG. 2 is a graph of brake torque versus input cable force for a brake actuator.

The lever 20 provides a stop 63 against the neck 60 of strut 21 to prevent over travel and to prevent reverse apply of brake actuator 10. The strut 21 locks in the socket 62 of lever 20 to assist in the assembly process and keep the strut 21 retained in position. The operation of the three-pivot joints in sockets 62, 53, and 54 provides minimized friction losses and results in improved efficiency and output. The brake torque achieved through various cable force inputs is graphically illustrated in FIG. 2.

Brake actuator 10 provides a changing ratio device in that as the lever is applied, movement is such that clearances are quickly taken up and as travel continues the lever ratio continually increases to convert to a high output device when it is most required at the application of the brake shoes to the brake drum. The pistons 17 and 18 are designed such that the load is applied near their center so that binding forces are minimized. The stop 63 of lever 20 also operates as a secondary stop surface against the wall of bore 27 if necessary.

What is claimed is:

1. A brake actuator for positioning between two brake shoe ends comprising:

an anchor having a mounting flange with an opening and having a bore oriented substantially perpendicular to the opening;

a first piston having a first slot with a first socket slidably carried in the bore and engaging one brake shoe end;

a second piston having a second slot with a second socket carried in the bore and engaging the other brake shoe end;

a lever having a third socket, extending through the opening of the anchor, engaging the first piston in the first socket and having a stop; and a reversible strut having a first cylindrical segment engaging the second piston in the second socket and having a second cylindrical segment engaging the lever in the third socket the first and second cylindrical segments connected by a neck which is engageable by the stop of the lever.

2. A brake actuator according to claim 1 wherein the first and the second pistons each have a cylindrical segment that is larger in diameter than the bore providing a stop for inward directed movement of each piston.

3. A brake actuator according to claim 1 wherein the lever is moveable to pivot the strut creating a force that moves the first and second pistons away from one another.

4. A brake actuator according to claim 2 wherein as the first and second pistons move away from one another a ratio of the force to the movement increases.

\* \* \* \* \*